US007147023B2

(12) United States Patent
Hyysti

(10) Patent No.: US 7,147,023 B2
(45) Date of Patent: Dec. 12, 2006

(54) METHOD FOR PEELING VENEER FROM LOGS

(75) Inventor: Mika Hyysti, Lahti (FI)

(73) Assignee: Raute Oyj (FI)

(*) Notice: Subject to any disclaimer, the term of this patent is extended or adjusted under 35 U.S.C. 154(b) by 0 days.

(21) Appl. No.: 11/389,107

(22) Filed: Mar. 27, 2006

(65) Prior Publication Data

US 2006/0162816 A1 Jul. 27, 2006

Related U.S. Application Data

(63) Continuation of application No. PCT/FI04/50137, filed on Sep. 23, 2004.

(30) Foreign Application Priority Data

Sep. 26, 2003 (FI) ................................ 20031389

(51) Int. Cl.
*B23Q 15/00* (2006.01)
*B23Q 16/00* (2006.01)
*B27B 1/00* (2006.01)

(52) U.S. Cl. ...................... 144/357; 144/365; 144/425; 144/215.2

(58) Field of Classification Search ................ 144/357, 144/356, 365, 215.2, 213, 402–404, 425; 702/167, 85, 94, 150–152, 155
See application file for complete search history.

(56) References Cited

U.S. PATENT DOCUMENTS 3,852,579 A * 12/1974 Sohn et al. ................. 702/167
4,246,940 A 1/1981 Edwards et al.
4,397,343 A 8/1983 Fields
4,672,552 A 6/1987 Ely
4,791,970 A * 12/1988 Walser et al. ............... 144/213
4,884,605 A * 12/1989 Ely ............................ 144/357
4,965,734 A * 10/1990 Edwards et al. ............ 144/357
5,511,598 A * 4/1996 Brand ........................ 144/356
5,564,253 A * 10/1996 Nakaya ....................... 144/356
5,787,949 A * 8/1998 Koike et al. ................ 144/357

OTHER PUBLICATIONS

International Search Report No. PCT/FI2004/050137, dated Jan. 26, 2005, 3 pages.

* cited by examiner

*Primary Examiner*—Bena Miller
(74) *Attorney, Agent, or Firm*—Connolly Bove Lodge & Hutz LLP

(57) ABSTRACT

The invention concerns a method for peeling veneer from a log, wherein the centering device is calibrated during the peeling process without interrupting the production. In the method in accordance with the invention, the around-contour of the log is defined by means of techniques of prior art in the centering device by measuring the distance between the surface of the log and the rotation axis at several positions at the length of the log, and the rotation centres of the ends of the log are set to the chucks of the lathe in accordance with this determination of contour. The validity of the centering is controlled, and a correction factor for the centering of a next log is transmitted to the apparatus commanding the centering device.

12 Claims, 4 Drawing Sheets

METHOD FOR PEELING VENEER FROM LOGS

Figure 1:
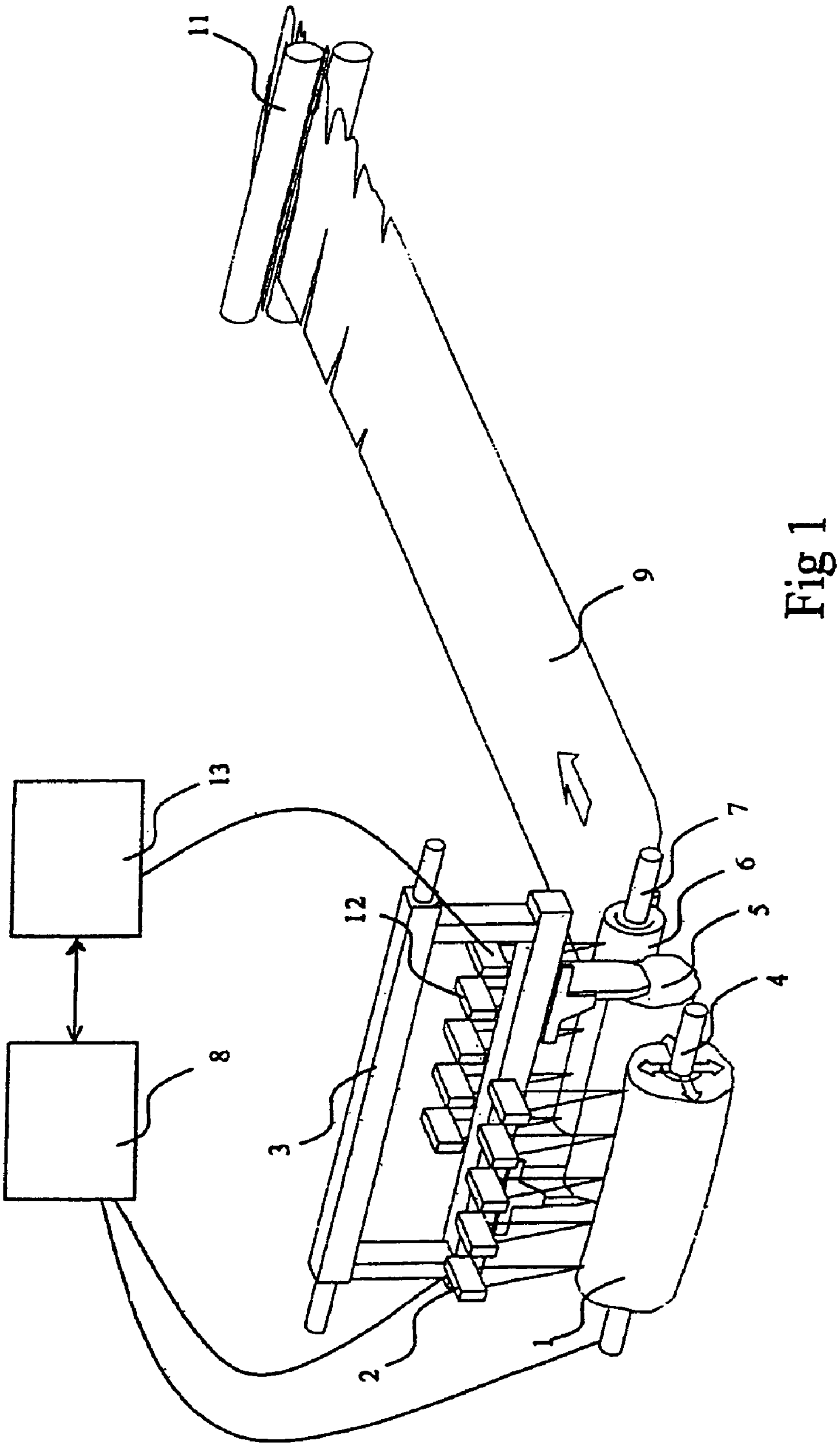

This application is a continuation of International Appl. No. PCT/FI2004/050137, filed on Sep. 23, 2004, entitled METHOD FOR CALIBRATING ROTATION CENTRES IN VENEER PEELING.

The present invention concerns a method for peeling veneer from a log. The method in accordance with the invention comprises operations that enable a flowing calibration of the apparatus used upstream the peeling operation for centering the log for the peeling.

In conventional veneer peeling, the centering of a log for positioning to the chucks of the peeling lathe is performed in a device located immediately upstream of the lathe. In this centering device an optimal turning axis is tried to be determined, around which the log to be rotated in the lathe can be peeled so as to gain an appropriate veneer yield. A traditional object has been to determine by the centering device a maximal cylinder in the log, the centre axis thereof being located as the rotation centre, after the log has been moved to the rotating chucks of the veneer peeling lathe.

For ensuring the appropriate operation of the centering device, it must be calibrated in several situations of operation. These situations include for instance introduction of a new centering device or the centering device after maintenance, elimination of the changes caused by wearing, as well as change of sensors and measuring elements used for the centering operation or the supervision thereof. Also changes in the operation of the devices during the use should be taken into account in order to receive an accurate centering result. The measuring sensors are affected by thermal drift and mechanical components are subject to wearing and temperature changes affecting the accuracy of operation of the components.

A method being basically reliable and generally used for calibrating the centering device is performed so that a log is first peeled perfectly round in the lathe. This round log is then returned to the centering device and centred therein. The centred round log is thereafter returned to the lathe and peeled into veneer. The coherency of the received veneer is observed, and, when incoherency detected, a correction factor is transmitted to the centering device.

One way to control the centering result is to observe a log inserted in the chucks of the lathe, using devices determining the distance from the device to the surface of the log. These measurements are performed usually at two points of the log length, near the ends of the log. The method provides first rounding the log on the lathe and returning it to the centering device. The round and centered log, when returned to the chucks of the lathe is then observed using said distance devices, and any inaccuracy detected is informed to the device commanding the centring apparatus. For finding the reason for an eventual eccentricity discovered in the lathe, the centering operation and its verification must be performed several times. In any case the calibration of the centering device causes a significant interruption of the production.

In the method in accordance with the present invention, the calibration of the centering device can be performed under continuous operation of the centering device and the lathe, and no special interruptions of operation are needed for performing the calibration.

The substantial embodiments of the invention will become apparent from the enclosed claim 1 and 5.

When implementing the invention, the peeling and the adjoining operations for detecting any inaccuracy in the operation of the centering device are performed on a log proceeding through the whole process, into a veneer web. The results received are used, when a need for correction detected, for the centering of a next log.

Figure 2:
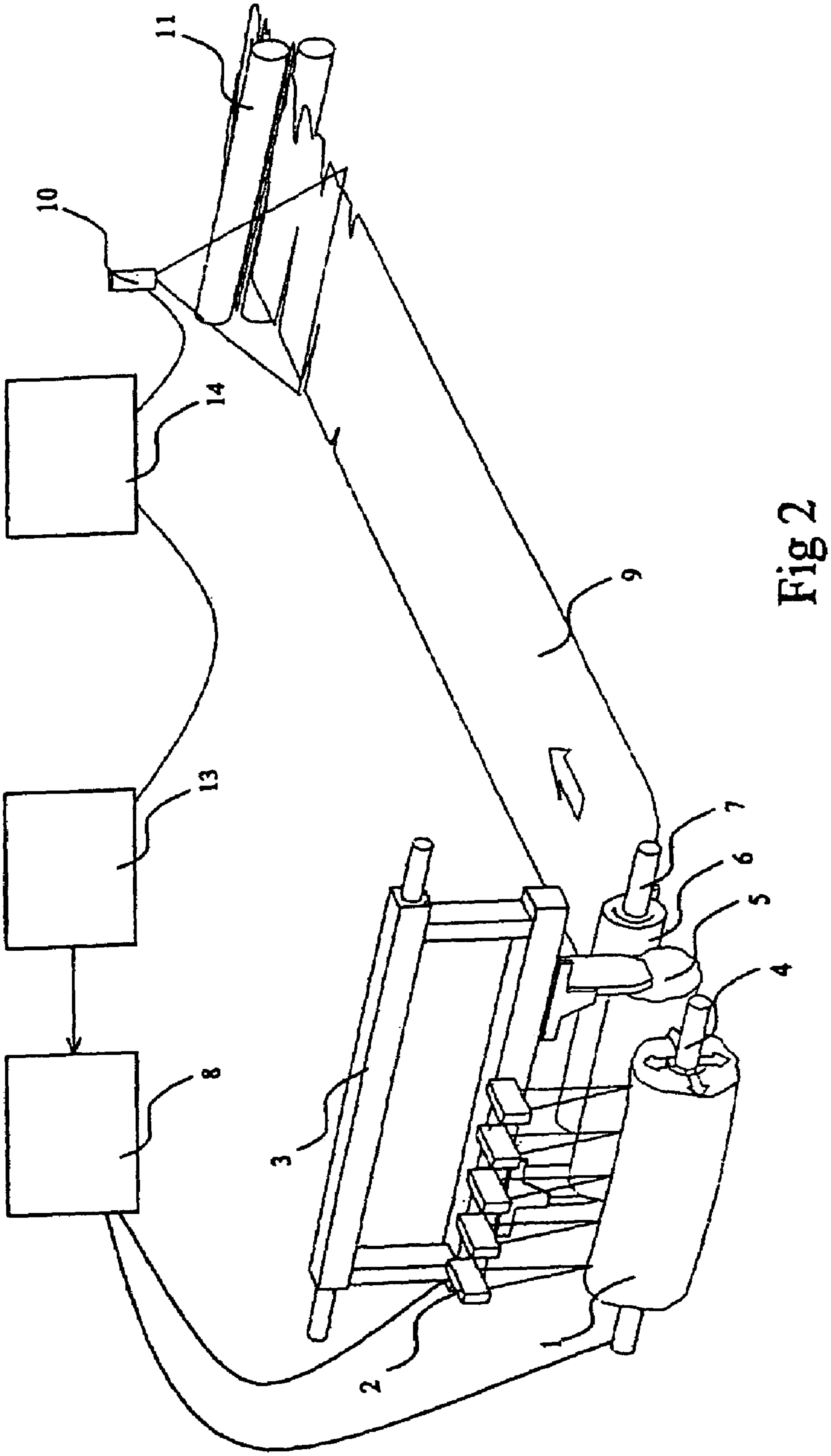
Figure 3:
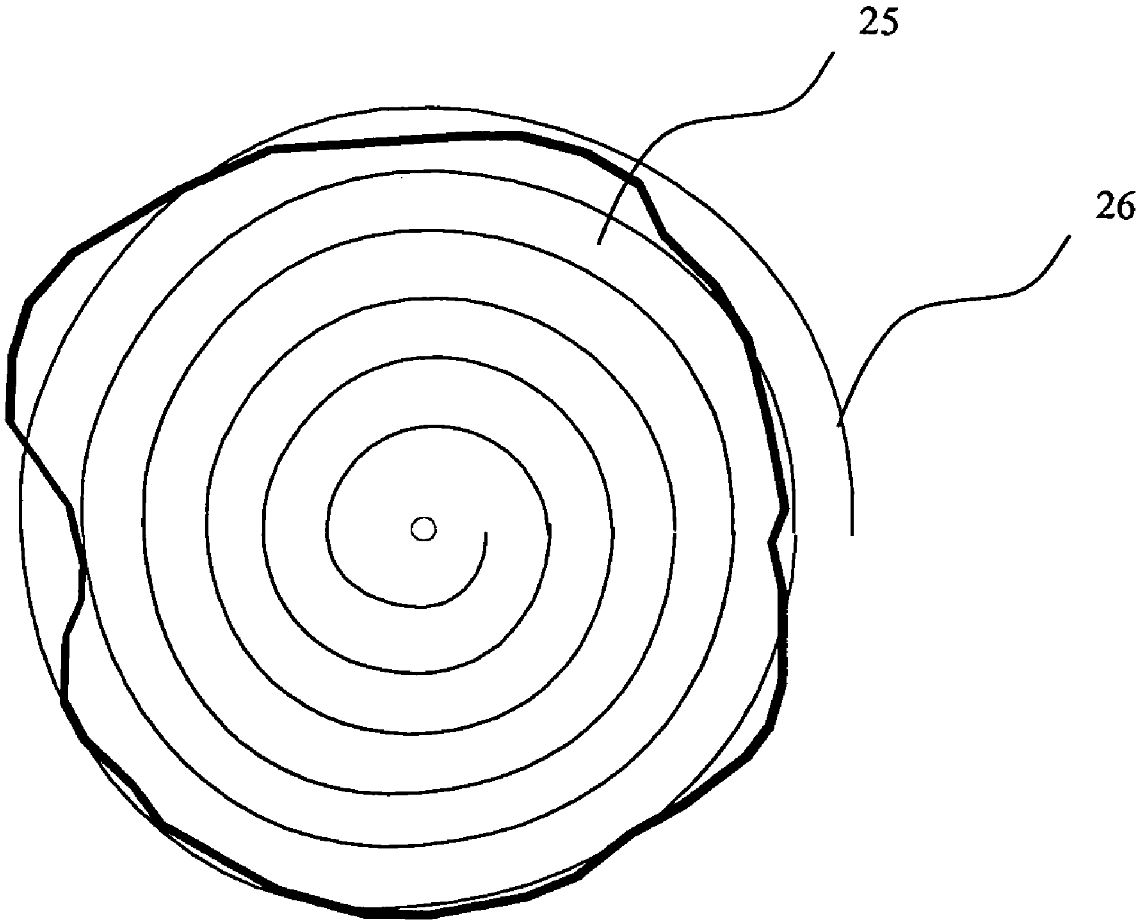
Figure 4:
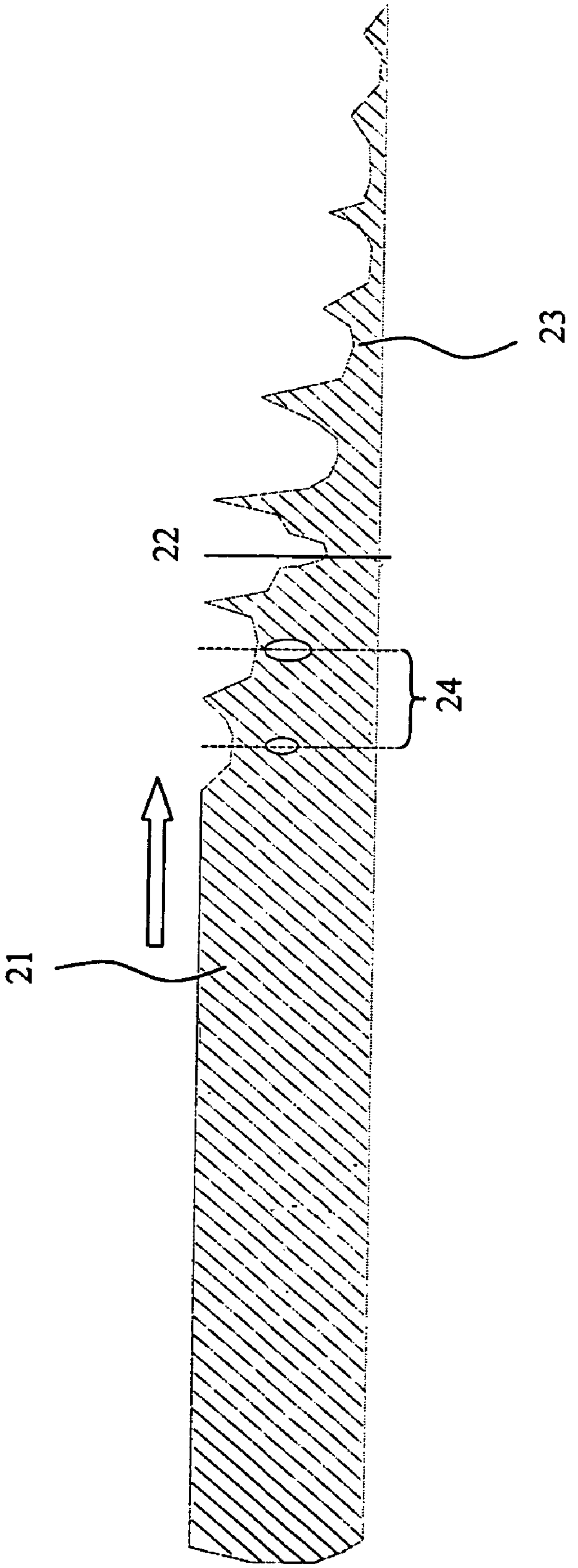

The invention will be described by means of the enclosed drawing, as an example only, wherein FIG. 1 shows a veneer peeling line, wherein one embodiment of the invention is applied, FIG. 2 shows another veneer peeling line, wherein a second embodiment of the invention is applied, FIG. 3 is an exemplified run of a peeling process, and FIG. 4 describes a mal-function possibility involved in the use of the apparatus of FIG. 2.

In FIG. 1 a veneer peeling line is shown, wherein the apparatus includes a centering device for a log 1 going to be peeled, a transfer device for a centred log 5, and a peeling lathe with a centred log 6 placed therein. The log 1 located in the centering device is supported by the rotatable spindles 4 of the device, by means of which the log is rotated about an axis crossing the log in its longitudinal direction. For scanning the surface of the log during the measurement rotation, the centering device comprises sensors 2, that can be for instance laser distance scanning sensors. There are sensors located at a mutual distances over the length of the log. The data given by the sensors 2 is transmitted to the computer 8 of the centering device, which determines the around-contour of the log based on this data. Based on this contour information, as well as on the objectives set for the peeling, a turning axis is determined for the log by the computer 8, according to which the log should be positioned to the chucks 7 of the lathe for achieving the required result. The centering device can also be implemented in a way known in the art, in which the log can be placed immovably in the spindles of the centering device, and the around-contour is determined by scanning the surface of the log from several directions.

In the described embodiment, there are provided distance sensors 12 in connection with the lathe, said distance sensors being applicable to the corresponding operation as the sensors 2 used in connection with the centering device. With these sensors 12 it is possible to determine, during the initial peeling revolutions, whether the log was positioned in the chucks in accordance with the turning centre defined by the centering device. There can be a plurality of these sensors, as shown in the figure, or only two, preferably in the vicinity of the ends of the log.

The data from the sensors 12 is transmitted to the data processing device, mainly to the computer 13. This computer has data communication with the computer 8 of the centering device. The computers 8 and 13 can naturally be one and the same with proper capacity.

In equipment in accordance with FIG. 2, the peeling result is controlled by means of a control apparatus 10 arranged in connection with the clipper 11, said control apparatus being for instance an optical camera device. The data received from the camera device is input to the computer 14 controlling the operation of the clipper, said computer being in operation contact with the computer 13.

In this embodiment of the invention, the information concerning the around-contour of the log and the calculated turning axis is used for a simulated peeling of the actual log, which simulation derives a virtual veneer web with a configuration determined by the around-contour and the selected turning axis. This virtual configuration of the veneer web is then compared with the configuration of the actually peeled veneer web, detected by the control apparatus 10.

When deviations either in the turning axis determined for a log (embodiment of FIG. 1) or in the configuration of the veneer webs (embodiment of FIG. 2) are detected, the computer commanding the centering device is informed accordingly. The computer uses a programmed correction factor for the centering of a subsequent log (especially the next log). The procedure is repeated, and the development of the deviations detected on actual logs is observed. An amendment for the correction factor is used as far as any deviation is detected.

The data to be used for the calibration of the centering device is preferably collected from several peeling events, in practice from several successive peelings of logs for providing a reliable calculated calibration result. An advantageous embodiment is to collect peeling result data continuously in connection with each peeling event and to analyze the results from the material received from a batch of few tens, for instance about 30 successive measurements, and to perform the calibration of the centering device (XY-positioning) based on the results of this sequence. The material formed by this amount of events provides a calculated possibility to evaluate the size and direction of the correction for the centering. The batches of the logs can be intervallic selected during the operational flow of the veneer peeling line.

The method according to the both embodiments disclosed above works in principle properly. More accuracy can be achieved, if the calculations for the optimal turning take into account also the hit point where the cutting blade starts the peeling operation. The meaning of this feature is illustrated in the enclosed drawing FIG. 3. The veneer is actually peeled along a spirally wound path around the periphery of the log, and the optimal yield is achievable only when the hit point is calculated taking the around-contour of the log and the turning axis determined on the around-contour information into account.

Another uncertainty might be embedded in the proceedings according to FIG. 2, where an optical control apparatus 10 is used. Said malfunction situation is illustrated in the enclosed drawing FIG. 4. The actually peeled veneer web 21 includes notches 23 at the beginning of the web. These notches will be repeated, but diminishing when the peeling is progressing. At lines 24 the notches are almost vanished, but some thinner spots on the web may still be remained. The optical device 10 is not able to detect these thinner spots, but the simulated peeling is aware of these. The consequent is a misleading information for the correction factor. A thickness measuring device positioned across the web can be used for eliminating the possibility for said miss-interpretation of the configuration of the web.

An alternative measurement applicable in the accomplishing the method of the invention explained in connection with the drawing FIG. 2 is to peel a log virtually backwards. Namely, when the information, received from the detecting apparatus 10 is processed (for instance in the computer 14), one result of the processing may be "a log" having an around contour developed from the information the detecting apparatus 10 has gained from the actually peeled web 9. This virtually produced around contour may then be compared to the around-contour the centering device initially calculated for the actual log. A deviation in the around-contour is a result of a mal-function of the apparatus, which mal-function can be taken into account in the correction factor transmitted to the device commanding the centring device.

The invention claimed is:

1. A method for peeling veneer from a log, comprising the following steps:

(a) conducting a first determination of a contour of the log along a length of said log and about a periphery of said log by rotating said log at a centering position around an axis crossing said log longitudinally;

(b) conducting a calculation of a first optimal turning axis for peeling said log based on said first determination of a contour of said log;

(c) positioning said log in a peeling position according to said fist optimal turning axis;

(d) conducting a second determination of a contour of said log along said length of said log and about said periphery of said log by rotating said log when said log is fixed in said peeling position;

(e) conducting a calculation of a second optimal turning axis for peeling said log based on said second determination of a contour of said log;

(f) comparing the calculation of the first optimal turning axis and the calculation of the second optimal turning axis;

(g) detecting whether a deviation between said calculation of said first optimal turning axis and said calculation of said second optimal turning axis exists;

(h) inserting a correction factor, for calculation of a first optimal turning axis for a subsequent log to be peeled, when a deviation between said calculation of said first optimal turning axis and said calculation of said second optimal turning axis exists;

(i) performing steps (a) through (f) in consecutive peelings; and (j) amending said correction factor in each of said consecutive peelings as far as any deviation between said calculation of said first optimal turning axis and said calculation of said second optimal turning axis exists in each of said consecutive peelings.

2. A method according to claim 1, wherein the optimal turning axis calculations are performed for each log consecutively peeled.

3. A method according to claim 1, wherein the optimal turning axis calculations are performed for batches of consecutive peeled logs.

4. The method according to claim 3, wherein the batches are intervally selected.

5. A method for peeling veneer from a log, comprising the following steps:

(a) conducting a determination of a contour of said log along a length of said log and about a periphery of said log by rotating said log around an axis crossing said log longitudinally;

(b) conducting a calculation of an optimal turning axis for peeling said log based on said determination of said contour of said log;

(c) positioning said log for peeling according to said optimal turning axis;

(d) peeling said log into an actual veneer web having an actual veneer configuration;

(e) using data from said calculation of said optimal turning axis to conduct a simulated virtual peeling of said log to a virtual veneer web having a simulated veneer configuration;

(f) detecting the actual veneer configuration;

(g) comparing said simulated veneer configuration to said actual veneer configuration;

(h) detecting whether a deviation between said simulated veneer configuration and said actual veneer configuration exists;

(i) inserting a correction factor, for conducting a calculation of an optimal turning axis for a subsequent log to be peeled in a subsequent peeling, when a deviation between said simulated veneer configuration and said actual veneer configuration exists;

(j) performing steps (a) through (h) in consecutive peelings; and (k) amending said correction factor in each of said consecutive peelings as far as any deviation between said simulated veneer configuration and said actual veneer configuration exists in each of said consecutive peelings.

6. A method according to claim 5, wherein the optimal turning axis calculations are performed for each log consecutively peeled.

7. A method according to claim 5, wherein the optimal turning axis calculations are performed for batches of consecutive peeled logs.

8. The method according to claim 7, wherein the batches are intervally selected.

9. A method for peeling veneer from a log, comprising the following steps:

(a) conducting a determination of an actual contour of said log along a length of said log and about a periphery of said log by rotating said log around an axis crossing said log longitudinally;

(b) conducting a calculation of an optimal turning axis for peeling said log based on said determination of said contour of said log;

(c) positioning said log for peeling according to said optimal turning axis;

(d) peeling said log into an actual veneer web having an actual veneer configuration;

(e) detecting a configuration of the actual veneer web;

(f) defining a virtual log contour that would produce a peeled web having said configuration of said actual veneer web;

(g) detecting whether any deviation exists between said actual contour of said log and said virtual log contour;

(h) inserting a correction factor, for the determination of an optimal turning axis for a log to be subsequently peeled, when a deviation between said actual contour of said log and said virtual log contour exists;

(i) performing steps (a) through (g) in consecutive peelings; and (j) amending said correction factor in each of said consecutive peelings as far as any deviation between said actual contour of said log and said virtual log contour exists in each of said consecutive peelings.

10. A method according to claim 9, wherein the optimal turning axis calculations are performed for each log consecutively peeled.

11. A method according to claim 9, wherein the optimal turning axis calculations are performed for batches of consecutive peeled logs.

12. The method according to claim 11, wherein the batches are intervally selected.

* * * * *